United States Patent [19]

Minemura et al.

[11] 4,285,570

[45] Aug. 25, 1981

[54] LIGHT BRANCHING DEVICE

[75] Inventors: Kouichi Minemura; Teiji Uchida, both of Tokyo, Japan

[73] Assignee: Nippon Electric Company, Ltd., Tokyo, Japan

[21] Appl. No.: 949,745

[22] Filed: Oct. 10, 1978

[30] Foreign Application Priority Data

| Oct. 14, 1977 [JP] | Japan | 52-123716 |
| Oct. 14, 1977 [JP] | Japan | 52-123717 |
| Aug. 17, 1978 [JP] | Japan | 53-113002[U] |
| Aug. 30, 1978 [JP] | Japan | 53-119339[U] |

[51] Int. Cl.³ .............................................. G02B 5/14
[52] U.S. Cl. ............................. 350/96.18; 350/96.15
[58] Field of Search ............... 350/96.18, 96.19, 96.31, 350/96.15, 96.16

[56] References Cited

U.S. PATENT DOCUMENTS

| 3,829,195 | 8/1974 | Rawson | 350/96.31 |
| 3,937,557 | 2/1976 | Milton | 350/96.16 |
| 4,111,524 | 9/1978 | Tomlinson | 350/96.19 |

OTHER PUBLICATIONS

A. Ishikawa et al. "Beam Splitting and Coupling Circuits Using a Selfoc Lens" 1977, Mar. Japan Electronic Communication Engineering.

J. D. Crow et al. "GaAs Laser Array Source Package" Optics Letters vol. 1, No. 1, Jul. 1977, pp. 40–42.
S. Sugimot et al. "Light Coupling from a DH Laser Into a Selfoc ® Fiber ...." Topical Meeting on Optical Fiber Transmission Jan. 1975, Williamsburg Va.
T. Uchida et al. "Optical Characteristics of A Light Focusing Fiber..." IEEE Journ. of Quantum Elec. QE-6, No. 10, pp. 606–612, Oct. 1970.
D. E. Altman "Fiber Optics Applications In the Shipboard Data Multiplex System" Naval Sea Systems Command Navsea 034 Jun. 1976.

*Primary Examiner*—Stewart J. Levy
*Attorney, Agent, or Firm*—Hopgood, Calimafde, Kalil, Blaustein & Judlowe

[57] ABSTRACT

A light branching device includes a light-focusing transmission body having a refractive index which decreases in proportion to the square of the distance from the plane of its optical axis, and two end faces perpendicular to the optical axis and a substantial light path length equal to an integral multiple of approximately one-half of the pitch at which the light propagates. The ends of a plurality of optical fibers are disposed adjacent to the end faces so that light emanating from one of the optical fibers is dispersed primarily in a plane parallel with the optical axis plane and impinges upon the end of at least one of the other optical fibers for transmission therethrough.

9 Claims, 12 Drawing Figures

LIGHT BRANCHING DEVICE

This invention relates to optical fiber communication, and more particularly to a light branching device for directing light from a plurality of optical fibers to another plurality of optical fibers.

In communication systems, signal branching devices are often needed for branching a single signal toward a plurality of destinations. Optical communication systems are now attracting particular interest because of their wide band width and high immunity to electromagnetic induction, among other features. Practical applications of optical fiber communication systems, which use optical fibers as transmission media, are especially desirable because of their long repeater spacings, low costs, small size, and the light weight and high flexibility of optical fibers, in addition to the above-mentioned common advantages of such optical systems.

Conventional light branching devices for optical fiber communication include a combination of an approximately 80 micron thick glass plate and a plurality of optical fibers arranged in a single direction along the edges of the plate in parallel and close proximity to one another (see "Fiber Optics Applications in the Shipboard Data Multiplex System" by D. E. Altman, published in the "Final report covering the period November 1975–June 1976", prepared for NAVAL SEA SYSTEMS COMMANDS). This light branching device, however, involves difficulties in the production of the glass plate and the assembly of the device because of the thinness of the plate. Another problem with this branching device is that, because both sides of the approximately 80 micron thick glass plate cause multiple reflection of light rays, smears on and other imperfections of the plate surfaces will result in losses when the light undergoes multiple reflection. On the other hand, use of a thicker glass plate in this light branching device would make the core diameter of glass fibers smaller than the plate thickness and accordingly would result in greater losses when the light is coupled from the glass plate to the optical fibers.

The object of the present invention is to provide a light branching device for optical fiber communication, which introduces low coupling losses and which is easy to assemble and manufacture.

In accordance with this invention, there is provided a light branching device comprising a light focusing transmission body possessing a refractive index which decreases approximately in proportion to the square of the distance from the plane of the optical axis and having two end faces approximately perpendicular to said optical axis and a substantial light path length equal to an integral multiple of approximately $\frac{1}{2}$ of the so-called pitch at which the light propagates undulatingly, and further comprising a plurality of optical fibers arranged with each fiber having an end lined up along one of said end faces.

The term "substantial light path length" herein refers to the effective length of the light propagation measured along the optical axis of the light focusing transmission body. Thus, for instance, if the light travels in one direction through the light focusing transmission body and then is reflected at the end face to travel backward, the substantial light path length will be twice the physical length at the light focusing transmission body along the optical axis. The term, therefore, is used in a different sense from the concept of light path length calculated by multiplying the physical length by the refractive index.

Since, in accordance with this invention, the light made incident onto the optical axis plane at one end of said light focusing transmission body emanates from the same optical axis plane, it is possible to branch the light among a plurality of optical fibers with little losses, and the light focusing transmission body, which need not be particularly thin, can be readily produced, with a corresponding ease in the assembly of the branching device.

The light focusing transmission body used in the device of this invention has a refractive index $n(r)$ which, in a section perpendicular to the optical axis plane, decreases with an increase in distance r from the optical axis plane approximately in a relationship represented by the following equation:

$$n(r) = n_0(1 - \tfrac{1}{2}ar^2) \tag{1}$$

wherein $n_o$ represents a refractive index on the optical axis plane and a, is a positive constant having the units 1/(length)(length) (see, for example, "Optical Characteristics of a Light focusing Fiber Guide and Its Applications" by T. Uchida et al, published on page 606, IEEE Journal of Quantum Electronics, Vol. QE-6, No. 10, October 1970, and "Light Coupling from a DH Laser into A SELFOC® Fiber Using Slab SELFOC® Lenses" by S. Sugimot et al, published in A Digest of Technical Papers on Optical Fiber Transmission, Jan. 7-9, 1975, Williamsburg, Va.). Such a light focusing transmission body may be produced by ion exchange or otherwise. Even if both of the end faces are flat, the light focusing transmission body functions as a lens for light having a vector component in the direction perpendicular to the optical axis plane because of the change of the refractive index in that direction. Relationships represented by the following equations hold in the direction perpendicular to the optial axis plane:

$$r_2 = \cos\left(\sqrt{a}\, L\right) r_1 + \frac{1}{n_o\sqrt{a}} \sin\left(\sqrt{a}\, L\right) \theta_1 \tag{2}$$

$$\theta_2 = -n_o\sqrt{a}\, \sin\left(\sqrt{a}\, L\right) r_1 + \cos\left(\sqrt{a}\, L\right) \theta_1 \tag{3}$$

where
- $r_1$ represents the distance the incident light is away from the optical axis plane as it passes through the input end face of the light focusing transmission body,
- $\theta_1$, the slope of the incident light beam with respect to the optical axis plane as it impinges upon the input end face of the light focusing transmission body,
- $r_2$, the distance the exiting light beam is away from the optical axis plane as it passes through the output face of the light focusing transmission body,
- $\theta_2$, the slope of the exiting light beam with respect to the optical axis plane as it emerges from the output end face of the light focusing transmission body, and
- L, the length of the light focusing transmission body, In particular, the minimum length of the light focusing transmission body required to have the light emanate with the same coordinates of position and angle as the incident position and angle is referred to as a pitch $L_o$, which is represented as follows on the basis of equations (2) and (3);

$$L_o = 2\pi/\sqrt{a} \quad (4)$$

Thus, a beam of light made incident onto a light focusing transmission body of a given length travels undulatingly at a constant pitch represented by equation (4). In particular, if $r_1$ equals 0 in equations (2) and (3), and the light is made incident onto one end face of the light focusing transmission body at an angle of $\theta_1$ with respect to the optical axis plane, $r_2$ will equal 0 and $\theta_2$ will equal, $-\theta_1$ where the length is equal to $(\frac{1}{4})\cdot L_o$ or $\frac{1}{4}$ of the pitch, and further, if the length of the light focusing transmission body is equal to $\frac{1}{4}$ of the pitch, the light will emanate from the other end face of the light focusing transmission body at an angle of $-\theta_1$ with respect to the optical axis plane. On the other hand, since there is no change in refractive index in the direction parallel to the optial axis plane, unlike in the direction perpendicular thereto, divergent light made incident onto the light focusing transmission body in the direction parallel to the optical axis plane will propagate through the liquid focusing transmission body and, sometimes by reflecting on the side wall of the light focusing transmission body, reaches the other end of the body. Therefore, if a focused light beam from optical fibers is made incident onto one end face of the light focusing transmission body, the beam, after propagating for a substantial light path length equal to an integral multiple of $\frac{1}{4}$ of the pitch, will have an oval cross section.

Next, the present invention will be described below with reference to the accompanying drawings.

BRIEF DESCRIPTION OF THE DRAWINGS

A more complete understanding of the present invention, and many of the attendant advantages thereof, will be apparent from the following detailed description when considered in conjunction with the accompanying drawings, wherein.

DESCRIPTION OF THE PREFERRED EMBODIMENTS

Figure 1:
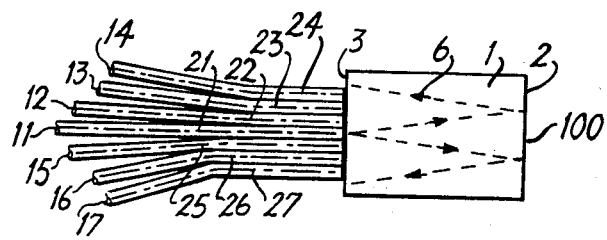
FIG. 1 is a side view of a first embodiment of the present invention.
Figure 2:
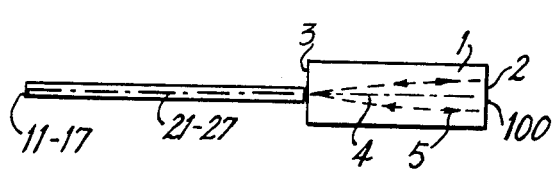
FIG. 2 is a top view of the embodiment shown in FIG. 1.

Referring to FIGS. 1 and 2, an end face 2 of a light focusing transmission body 1 having a length equal to $\frac{1}{4}$ of a pitch is coated with a reflective film 100, and in close proximity to the other end face 3 are arranged end faces of an optical fiber 11 from which the light emanates and of optical fibers 12-17 onto which branched light from the optical fiber 11 is made incident. These components are arranged so that the end face 3 of the light focusing transmission body 1 is approximately in parallel with the end faces of the optical fibers 11-17 and so that the center axes 21-27 of the optical fibers 11-17 lie in the optical axis plane 4 of the light focusing transmission body 1. As indicated by equation (1) and FIG. 3, the refractive index is a function of the square of the distance from the optical axis plane. The light incident on the light focusing transmission body 1 from the optical fiber 11, having a vector component in the direction perpendicular to the optical axis plane 4 of the light focusing transmission body 1, is bent toward the optical axis plane and then is reflected on the reflective end face 2 to travel back through the light focusing transmission body, as shown by the light beam 5 in FIG. 2 for instance. The light beam thereby travels in effect a light path length corresponding to $\frac{1}{2}$ of the pitch. Meanwhile, the light coming incident on the light focusing transmission body 1 from the optical fiber 11, having a component in the direction parallel to the optical axis plane 4 of the light focusing transmission body 1 where the refractive index is constant, is reflected on the end face 2 to travel back through the light focusing transmission body as shown by the light beam 6 in FIG. 1. Therefore, the light emanating from the optical fiber 11, which comes into the light focusing transmission body 1 through its end face 3 in a spotlight form, again emanates from the end face 3 in a beam having an oval cross section, the longer axis of the oval being parallel with the optical axis plane. Since one end of every one of the optical fibers 11-17 is close to the end face of the light focusing transmission body 1, the center axes 21-27 of the optical fibers 11-17 are positioned on the extension of the optical axis plane 4 of the light focusing transmission body 1, and the side walls of the optical fibers 11-17 are close to one another, said oval beam is efficiently coupled to the optical fibers 12-17.

Figure 3:
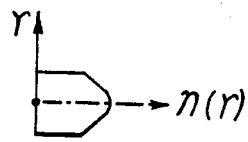
FIG. 3 is a schematic diagram illustrating the relation of the refractive index (N(r)) of the light focusing transmission body as a function of the distance (r) away from the optical axis plane of the light focusing transmission body.

The light focusing transmission body 1 having, in the direction of its thickness, a refractive index distribution as illustrated in FIG. 3 can be obtained by soaking an approximately 0.5 mm thick base plate made of glass containing thallium ions in hot melted potassium salt. A light focusing transmission body made by this process, wherein $n_o$ equals 1.63 and a, equals 1.6 mm$^{-2}$, has been realized. A quarter of the pitch of this product, according to equation (4), is $\frac{1}{4}L_o = 1.24$ mm. The reflective coating of the end face 2 may be made of a dielectric multilayer film or aluminum coat. Production of a light focusing transmission body of such constitution and assembly of a branching device involving such a body can be readily achieved because of the relatively great thickness, about 0.5 mm, of the light focusing transmission body 1. The optical fibers 11-17, may comprise silica fibers of 100 microns in core diameter, 150 microns in clad diameter and 0.2 in N.A. Since the maximum emanating angle of light from optical fibers adjacent the end face of the light focusing transmission body 1 is represented by $\theta_{max}=\sin^{-1}(N.A.)$, the maximum emanating angle $\theta_{max}$ of light from the optical fiber 11 having an N.A. of 0.2 is 11.5°. This light beam, upon return to the end face 3 of the light focusing transmission body 1 after being reflected on the end face 2, is about ±550 micron wide in the direction parallel to the optical axis plane. It is therefore possible to arrange three optical fibers along each side of the optical fiber 11, so that the emanating light from the optical fiber 11 is branched into six other optical fibers. Because the loss incurred from the branching of light into these six optical fibers is approximately 12 dB, the excess branching loss after subtraction of an inevitable loss of about 8 dB resulting from the branching of light into six optical fibers is about 4 dB.

The clad parts near the end faces of the optical fibers 11-17 may be made thinner by etching or otherwise so that the core parts of the optical fibers nearly come into direct contact with each other. The proportion of light coming incident on the clad parts can thereby be reduced, and the branching loss can be made even smaller, or the number of optical fibers into which the light is to be branched can thereby be increased without increasing the branching loss. If the cores, 100 microns in diameter, are exposed in the parts near the end faces of said optical fibers 11-17, five optical fibers can be arranged along each side of the optical fiber 11. In this instance, the loss incurred from the branching of light into a total of 10 optical fibers will be approximately 12 dB, about equal to that in the aforementioned case of branching the light into six optical fibers whose clad parts near the end faces remain intact, and the excess branching loss will be reduced to about 2 dB.

Although the light is supposed to be branched from the optical fiber 11 into the optical fibers 12-17 in the first embodiment, the light can of course be branched from any one into any others of the optical fibers 11-17. These optical fibers can also be used as both sources and recipients of the branched light, i.e. as two-way transmission paths.

It is also possible to reduce the reflective loss by applying refractive index adjusting liquid into the gap between the end face 3 of the light focusing transmission body 1 and the end faces of the optical fibers 11-17 close to the end face 3, or simultaneously to reduce the reflective loss and to fix the relative positions of the end faces of the light focusing transmission body 1 and the optical fibers 11-17 by inserting between them transparent adhesive which also serves to adjust the refractive index.

Although, in this first preferred embodiment, the physical length of the light focusing transmission body 1 is set at ¼ of the pitch, it can be slightly shorter than ¼ of the pitch and, if it is, the gap between the optical fibers 11-17 and the light focusing transmission body 1 should be somewhat widened. The length of the light focusing transmission body 1 can of course be approximately an integral multiple of ¼ of the pitch.

Figure 4:
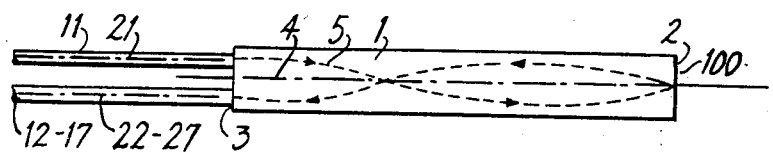
FIG. 4 is a side view of a second embodiment of the present invention.

Furthermore, although the center axes 21-27 of the optical fibers 11-17 are supposed to be on the extension of the optical axis plane 4 of the light focusing transmission body 1 in this embodiment, if the length of the light focusing transmission body 1 is equal to ¼(2m+1) of the pitch (where m is an integer) as illustrated in FIG. 4, the center axes 22-27 can be approximately parallel to the optical axis plane 4 and the center axis 21 of the optical fiber 11 can be on a symmetrical plane to the center axes 22-27 of the optical fibers 12-17 with respect to the optical axis plane 4. In this instance the optical fibers cannot be used as two-way transmission paths, but another optical fiber to receive branching of light from the optical fiber 11 can be added into the position symmetrical to the optical fiber 11 with respect to the optical axis plane 4.

Figure 5:
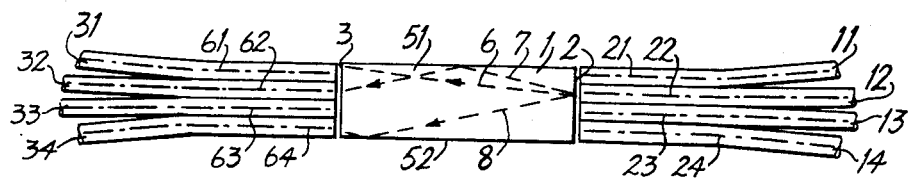
FIG. 5 is a side view of a third embodiment of the present invention.
Figure 6:
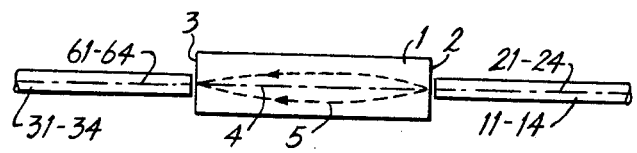
FIG. 6 is a top view of the embodiment shown in FIG. 5.

Referring to FIGS. 5 and 6, optical fibers 11-14 and 31-34 are arranged with their end faces positioned close to one end face 2 and the other end face 3, respectively, of a light focusing transmission body 1 whose physical length is equal to ½ of the pitch. The end faces 2 and 3 of the light focusing transmission body 1 are approximately perpendicular to the optical axis plane 4, and said optical fibers 11-14 and 31-34 are so arranged that one end face of every one of said optical fibers 11-14 and 31-34 is approximately parallel to the end face 2 or 3, whichever is applicable, and so that the center axes 21-24 and 61-64 of the optical fibers 11-14 and 31-34, respectively, are on the extension of the optical axis plane 4 of the light focusing transmission body 1. The light coming incident on the light focusing transmission body 1 from the optical fibers 11-14 travels, in the direction perpendicular to the optical axis plane 4 of the light focusing transmission body 1, like the light beam 5 to converge on the end face 3. On the other hand, in the direction parallel to the optical axis 4 of the light focusing transmission body 1, where the refractive index is constant, the light coming incident on the light focusing transmission body 1 from, for instance, the optical fiber 12 travels like the light beams 6, 7 and 8 to reach the end face 3. In this instance, the light may be reflected on side walls 51 and 52 of the light focusing transmission body 1. Therefore, the output light from the optical fiber 12, coming into the light focusing transmission body 1 through its end face 2 in a spotlight form, emanates from the other end face 3 in a beam having an oval cross section, the longer axis of the oval being parallel with the optical axis plane. The light beams emanating from the optical fibers 11, 13 and 14 also exit from the end face 3 in beams having similarly oval cross sections. Since one end of every one of the optical fibers 31-34 is close to the end face 3 of the light focusing transmission body 1, the center axes 61-64 of the optical fibers 31-34 are positioned on the extension of the optical axis plane 4 and the side walls of the optical fibers 31-34 are close to one another, the oval beams are efficiently, i.e. with little losses, coupled to the optical fibers 31-34.

If the length of the light focusing transmission body 1 is set at 2.48 mm, corresponding to ½ of the pitch, and optical fibers having the same shape and numerical aperture as those in the first embodiment are used, it is possible to branch the light beams from the optical fibers 11-14 into the other four optical fibers with a branching loss of approximately 9 dB and an excess branching loss of about 3 dB. Further by making the clad parts near the end faces of the optical fibers 31-34 thinner by etching or otherwise so that the core parts of the optical fibers nearly come into direct contact with one another. The proportion of light incident on the clad part can thereby be reduced, and the branching loss can be made even smaller, or the number of optical fibers into which the light is to be branched can thereby be increased without increasing the branching loss.

Although in this embodiment the length of the light focusing transmission body 1 is supposed to be ½ of the pitch, it can be slightly shorter than ½ of the pitch and, if it is, the gaps between the optical fibers 11-14 and 31–34 and the light focusing transmission body 1 should be somewhat widened. The length of the light focusing transmission body 1 can of course be approximately an integral multiple of ½ of the pitch, such as equal to the full pitch or 1½ of the pitch.

Figure 7:
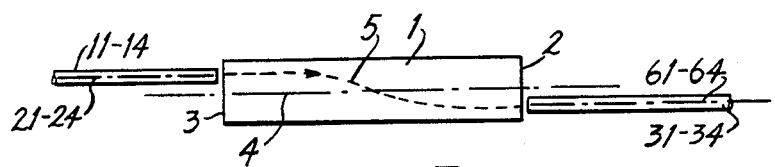
FIG. 7 is a top view of a fourth embodiment of the present invention.
Figure 8:
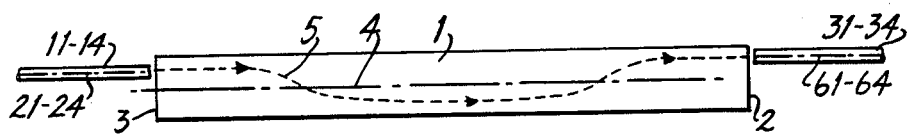
FIG. 8 is a top view of a fifth embodiment of the present invention.

Furthermore, although the center axes 21–24 and 61–64 of optical fibers 11–14 and 31–34, respectively, are supposed to be on the extension of the optical axis plane 4 of the light focusing transmission body 1 in this embodiment, if the length of the light focusing transmission body 1 is equal to ½(2m+1) of the pitch (where m is an integer), as illustrated in FIG. 7, the center axes 21–24 and 61–64 may be approximately parallel to the optical axis plane 4 and the center axes 21–24 of the optical fibers 11–14 may be on a symmetrical plane to the center axes 61–64 of the optical fibers 31–34 with respect to the optical axis plane 4. If, as illustrated in FIG. 8, the length of the light focusing transmission body 1 is equal to 2m/2 (where m is an integer), the center axes 21–24 and 61–64 of the optical fibers 11–14 and 31–34, respectively, may be on the same plane parallel to the optical axis plane 4. Further, in these cases, the center axes 21–24 and 61–64 of the optical fibers may be slightly inclined at the same angle in relation to the optical axis plane 4 of the light focusing transmission body 1. However, the direction of the inclination of the center axes 61–64 should be converse to, if the length of the light focusing transmission body 1 is equal to ½(2m+1) of the pitch, or the same as, if the length of same is equal to 2m/2 of the pitch, that of the inclination of the center axes 21–24.

Figure 9:
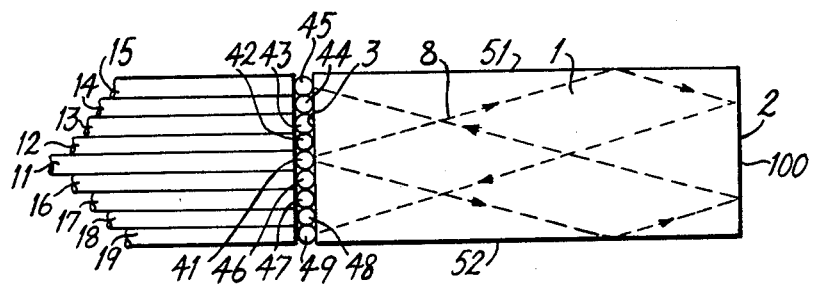
FIG. 9 is a side view of a sixth embodiment of the present invention.
Figure 10:
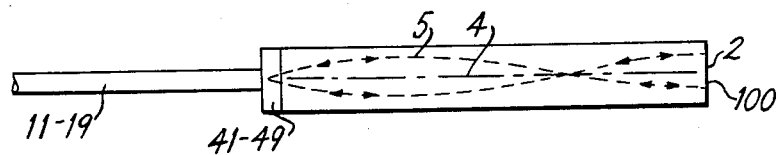
FIG. 10 is a top view of the embodiment shown in FIG. 9.

In FIGS. 9 and 10, one end face 2 of the light focusing transmission body 1 which is slightly shorter than ¾ of the pitch (3.72 mm), 0.5 mm thick and 1.2 mm wide, is coated with a reflective film 100. Close to the other end face 3, a plurality of cylindrical lenses 41–49, having a refractive index of 1.63 and measuring 150 microns in diameter, are arranged so that their center axes are perpendicular to the optical axis plane 4 of the light focusing transmission body 1. Further, in close proximity to each side wall of a cylindrical lens 41–49 is arranged one end face of an optical fiber 11–19, measuring 150 microns in diameter and having a numerical aperture of 0.26. The center axes of the optical fibers 11–19 are positioned approximately on the extension of the optical axis plane 4 of the light focusing transmission body 1. The side walls 51 and 52 of the light focusing transmission body 1 are optically polished or reflective-coated so as to be perpendicular to the optical axis plane 4 and the end faces 2 and 3.

Light emanating from, for instance, the optical fiber 11, in the direction parallel to the center axes of the cylindrical lenses, comes incident divergently on the light focusing transmission body 1 through the cylindrical lens 41, but light emanating in the direction perpendicular to the center axes of the cylindrical lenses is focused by the cylindrical lenses to come incident on the light focusing transmission body 1. The light incident on the light focusing transmission body 1 from the optical fiber 11 through the cylindrical lens 41, in the direction perpendicular to the optical axis plane 4 of the light focusing transmission body 1, travels as indicated by the light beam 5 in FIG. 10, returns through the light focusing transmission body after reflecting on the reflective end face 2. The light beam thereby travels in effect a light path length corresponding to 3/2 of the pitch, and then converges through a cylindrical lens. Meanwhile, in the direction parallel to the optical axis plane 4 of the light focusing transmission body 1, where the refractive index is constant, the light from the optical fiber 11, focused by the cylindrical lens 41 into a position close to the end face 3 of the light focusing transmission body 1, travels expandingly in the light focusing transmission body 1. Part of the light is reflected on the side walls 51 and 52 as shown by the light beam 8 in the FIG. 9. Further, as the cylindrical lenses 41–49 are arranged close to the end face 3, the light emanating from the end face in the direction parallel to the optical axis plane 4 of the light focusing transmission body 1 is separately focused by each of the cylindrical lenses 41–49. Since one end face of each of the optical fibers 11–19 is positioned at the corresponding one of these focal points and, since the optical fibers 11–19 are arranged so that their center axis lie in the extension of the optical axis plane 4 of the light focusing transmission body 1, the light is efficiently, i.e. with little losses, coupled to the optical fibers 12–19.

Since the light emanating from the optical fiber 11 is concentrated into a thickness approximately equal to the core diameter of the fiber by the light focusing transmission body 1 and the cylindrical lenses 41–49 when it is branched into the optical fibers 12–19, it is coupled to the optical fibers with little loss. Accordingly there is no particular need for removal of the clad parts of the optical fibers, by etching or otherwise, to expose the cores. The loss incurred from the branching of light into eight optical fibers is approximately 10 dB, and the excess branching loss, about 1 dB, both of which are remarkably low.

The lenses might also be semicylindrical lenses formed by bisecting full cylindrical lenses in the direction of their optical axes. The planar surface of the semicylindrical lenses should then be arranged in parallel to the end face 3 of light focusing transmission body 1.

The cylindrical or semicylindrical lenses may be made of such material as epoxy resin or acryl resin. It also is permissible to separately produce a matrix of semicylindrical lens made of epoxy resin or the like, which is located on the end face 3 of the light focusing transmission body 1.

Figure 11:
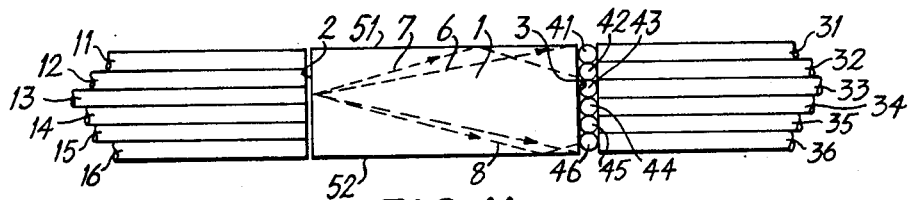
FIG. 11 is a side view of a seventh embodiment of the present invention.
Figure 12:
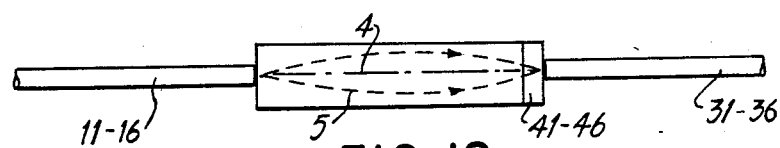
FIG. 12 is a top view of the embodiment shown in FIG. 11.

In FIGS. 11 and 12 is illustrated a light branching device which is the same as the embodiment illustrated in FIGS. 5 and 6 except that the length of the light focusing transmission body 1 is slightly shorter than ½ of the pitch (2.48 mm). Cylindrical lenses, 150 microns in diameter, are arranged between the end face 3 of the light focusing transmission body 1 and the optical fibers positioned close to this end face. The number of optical fibers is 12. The manner in which the light travels and is focused in this light branching device can be readily understood from FIGS. 11 and 12, the embodiment referred to above, and the preceding discussion thereon.

In this embodiment, the loss incurred from the branching of light into the six optical fibers is approximately 9 dB, and the excess branching loss, 1 dB, both remarkably low.

Whereas the length of the light focusing transmission body in the above-described embodiments is ¼, ½, ¾ or 1 of the pitch, the substantial light path length is ½ or 3/2 of the pitch when the length of the light focusing transmission body is ¼ or ¾, respectively, because a reflective surface is provided at one end in these cases and the incident beam is reflected on this surface to return to the other end face. In the other embodiments where the length of the light focusing transmission body is ½ of or equal to the full pitch, the substantial light path length also is ½ of or equal to the full pitch because the light is transmitted through, rather than reflected from the end face.

As is obvious from the above description and equations (2) and (3), this invention allows the substantial path length of the light transmitted through the light focusing transmission body to be any integral multiple of ½ of the pitch.

It will be clear to those skilled in the art that variations and modifications of the above-described preferred embodiments may be made without departing from the spirit and scope of the invention. Consequently, the invention as claimed below may be practiced otherwise than as specifically described above.

What is claimed is:

1. A light branching device comprising a light focusing transmission body having a refractive index decreasing approximately in proportion to the square of the distance from the optical axis plane and first and second end faces approximately perpendicular to said optical axis plane, said second end face having a reflective means, said light focusing transmission body having a physical length measured in the direction of said optical axis equal to an integral multiple of approximately ¼ of the pitch and a substantial light path length equal to an integral multiple of approximately ½ of the pitch at which the light propagates, a plurality of optical fibers, one end of each of said optical fibers lying adjacent to said first end face of said light focusing transmission body and focusing means disposed between the ends of at least a proportionate number of said optical fibers and said light focusing transmission body, said focusing means having its center axis in a direction perpendicular to said optical axis plane and having a curved surface parallel to its center axis, whereby the light beam from a selected one of said optical fibers is respectively coupled to at least one other of said optical fibers.

2. A light branching device as set forth in claim 1, wherein said light focusing transmission body has a physical length measured in the direction of said optical axis equal to an odd multiple of approximately ¼ of the pitch, and wherein a proportionate number of said optical fibers are arranged on each of at least two planes which are symmetrical to each other with respect to said optical axis plane.

3. A light branching device comprising a light focusing transmission body having a refractive index decreasing approximately in proportion to the square of the distance from the optical axis plane and first and second end faces approximately perpendicular to said optical axis plane, said light focusing transmission body having a physical length and a substantial light path measured in the direction of said optical axis equal to an integral multiple of approximately ½ of the pitch at which the light propagates, a plurality of optical fibers, one end of each of said optical fibers lying adjacent to one of said end faces, and focusing means disposed between the ends of at least a proportionate number of said optical fibers and said light focusing transmission body, said focusing means having its center axis in a direction perpendicular to said optical axis plane and having a curved surface parallel to its center axis, whereby the light beam from a selected one of said optical fibers is respectively coupled to at least one other of said optical fibers.

4. A light branching device as set forth in claim 1 or 3, wherein said optical fibers are positioned in close contact with one another and have their center axes on the extension of said optical axis plane.

5. A light branching device as set forth in claim 3, wherein a proportionate number of said optical fibers are arranged in close contact along each of the two end faces of said light focusing transmission body and having their center axes on the extension of said optical axis plane.

6. A light branching device as set forth in claim 3, wherein said light focusing transmission body has a physical length measured in the direction of said optical axis plane equal to an odd multiple of approximately ½ of the pitch, and wherein a proportionate number of said optical fibers are arranged on each of at least two planes which are symmetrical to each other with respect to said optical plane.

7. A light branching device as set forth in claim 3, wherein said light focusing transmission body has a physical length measured in the direction of said optical axis plane equal to an even multiple of approximately ½ of the pitch, and wherein said optical fibers are arranged in a plane parallel to said optical axis plane.

8. A light branching device as set forth in claim 1 or 3, in which said focusing means comprises at least one cylindrical lens.

9. A light branching device as set forth in claim 1 or 3, wherein said optical fibers are arranged side by side in a direction approximately parallel with said optical axis plane and wherein the surface of one end of each of said optical fibers lies approximately parallel with one of said end faces.

* * * * *